United States Patent
Campo-Rembado et al.

(10) Patent No.: US 8,744,947 B1
(45) Date of Patent: Jun. 3, 2014

(54) SYSTEM AND METHOD FOR OPTIMIZING MEDIA PORTFOLIO ALLOCATION

(75) Inventors: Miguel A. Campo-Rembado, Orlando, FL (US); Cameron J. Davies, Winter Garden, FL (US); Deborah A. Montague, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 765 days.

(21) Appl. No.: 12/794,408

(22) Filed: Jun. 4, 2010

(51) Int. Cl.
*G06Q 40/00* (2012.01)
*G06Q 40/06* (2012.01)
*G06Q 30/02* (2012.01)

(52) U.S. Cl.
CPC ............ *G06Q 40/00* (2013.01); *G06Q 40/06* (2013.01); *G06Q 30/02* (2013.01)
USPC ........................................ 705/36 R

(58) Field of Classification Search
CPC ........ G06Q 40/00; G06Q 40/06; G06Q 30/02
USPC ........................................ 705/36 R
See application file for complete search history.

(56) References Cited

U.S. PATENT DOCUMENTS

2004/0093296 A1* 5/2004 Phelan et al. .................. 705/36

* cited by examiner

*Primary Examiner* — Daniel Felten
(74) *Attorney, Agent, or Firm* — Patterson & Sheridan, LLP

(57) ABSTRACT

One embodiment of the present invention sets for a mechanism for determining an optimized investment strategy across a portfolio of media channels for a given product or service. For each media channel in the portfolio, the unadjusted elasticity indicating an estimated effectiveness of the media channel when used for marketing is adjusted based on risk information associated with the media channel. The risk adjusted elasticity corresponding to each media channel in the portfolio is then used to determine an investment allocation for the media channel.

20 Claims, 5 Drawing Sheets

SYSTEM AND METHOD FOR OPTIMIZING MEDIA PORTFOLIO ALLOCATION

BACKGROUND

1. Field of the Invention

The present invention relates to the field of media portfolio management and, in particular, to a system and method for optimizing media portfolio allocation.

2. Description of the Related Art

For a given product or service, there are many different media channels that can be used for marketing, such as television, social media, online banners, radio, etc. To optimize the investment strategy across a multitude of media channels, decision makers often estimate the effectiveness of the media channel when used to market the given product or service based on historical data. An optimal media portfolio is then determined based on the estimated effectiveness information of each media channel.

One drawback to such an approach is that the estimated effectiveness of a media channel may not be accurate. For example, emerging media channels (e.g., social media), the estimated effectiveness may indicate that emerging media channels are highly effective marketing tools but, because there is not a large amount of historical data supporting the estimated effectiveness, the estimation may be inaccurate. Additionally, the effectiveness of certain media channels may be estimated with high precision than other media channels, thus resulting in a skewed media portfolio optimization.

Decision makers often try to account for these estimation inaccuracies by imposing artificial limits when determining an optimized investment strategy across media channels. For example, in one scenario the investment in a particular media channel may not deviate more than 20% than the investment in the particular media channel in a current investment strategy. In another scenario, the percentage of the total investment in any one media channel is capped to account for risk. The artificial limits, however, are static and, therefore, do not directly account factors that affect the estimated effectiveness.

As the foregoing illustrates, there is a need in the art for a mechanism for optimizing investment strategy across a media portfolio that takes effectiveness estimation accuracies into account.

SUMMARY

Embodiments of the invention include a computer-implemented method for determining an optimized investment strategy across a portfolio of media channels for a given product or service. The method comprises the steps of receiving data associated with each media channel in the portfolio of media channels, wherein the data associated with a particular media channel includes an unadjusted elasticity that indicates a percentage change in a metric corresponding to the given product or service generated by a percentage increase in the level of investment in the media channel as well as a risk factor that indicates the accuracy of the unadjusted elasticity, for each media channel, computing a marginal revenue based on the unadjusted elasticity associated with the media channel, wherein the marginal revenue associated with a particular media channel indicates a change in the metric corresponding to the given product or service generated by a unit of additional investment in the media channel, and, for each media channel, adjusting the marginal revenue associated with the media channel based on the risk factor included in the data associated with the media channel. The method also comprises the steps of, for each media channel, converting the adjusted marginal revenue associated with the media channel to an adjusted elasticity, and determining an optimized level of investment in each media channel included in the portfolio of media channels based on the adjusted elasticity associated with the media channels.

One advantage of the techniques described herein is that the elasticity of a media type is adjusted based on an estimated risk indicating a confidence level in the accuracy of the elasticity. The adjusted elasticity then is used to determine an optimal investment strategy in a media portfolio that is less exposed to the risk of inaccurate elasticity measurements.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
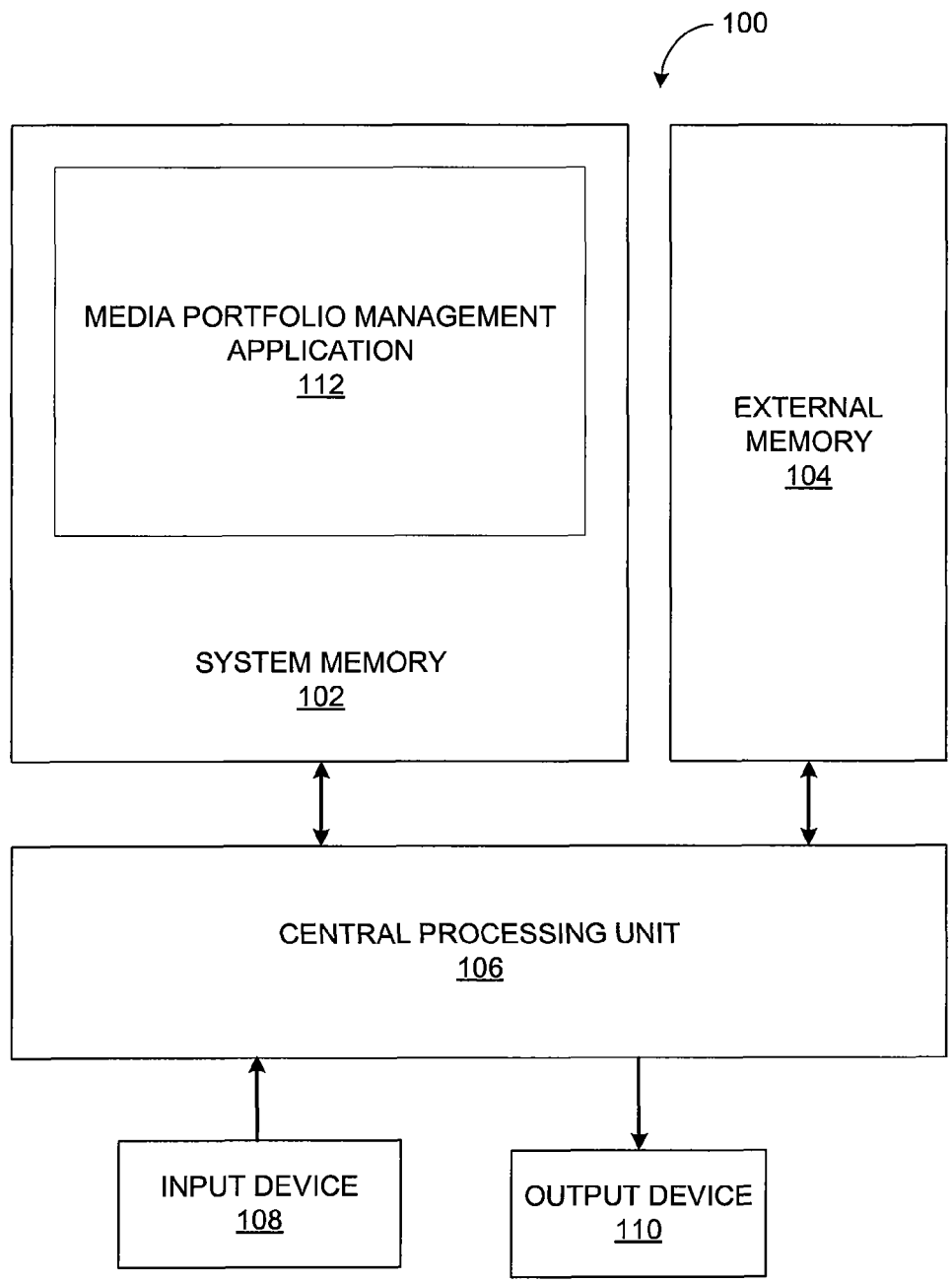
FIG. 1 is a block diagram of a system configured to implement one or more aspects of the invention.

FIG. 1 is a block diagram of a system 100 configured to implement one or more aspects of the invention. As shown, the system 100 includes a system memory 102, an external memory 104, a central processing unit (CPU) 106, an input device 108 and an output device 110.

The system memory 102 is a memory space, usually a random access memory (RAM), that temporarily stores software programs running within the system 100 at any given time. The system memory 102 includes a media portfolio management application 112. The media portfolio management application 112 is a software program that enables users to evaluate the effectiveness of different types of media types for marketing certain products or services. Through the media portfolio management application 112, a user can optimize a marketing strategy for a particular product or service or for a group of products and/or services by determining which media types are most effective for marketing the relevant products and services. The effectiveness of a media type is determined based on the impact of using the media type for marketing a product or service on metrics corresponding to the product or service. In one embodiment, a metric corresponding to a given product or service is determined based on the product of the volume of sales of the given product or service and the average price of the unit of product or service. For example, if the marketing media type is used for marketing a theatre show, then the application specific metrics used for measuring the return per unit of investment include ticket sales of the theatre show. In another embodiment, a metric corresponding to the given product or service is determined based on the product of the number of viewers of the given product or service and the average advertising revenue generated by each extra viewer. Similarly, if the marketing media type is used for marketing TV shows, then the application specific metrics used for measuring the return per unit of investment include television viewership numbers.

The CPU 106 executes a sequence of stored instructions associated with and/or transmitted from the various elements in the computer system 100. The external memory 104 is a storage device, e.g. a hard disk, for storing graphics data associated with the media portfolio management application 112. The input device 110 is an end-user controlled input device, e.g. a mouse or keyboard, that allows a user to manipulate various aspects of the media portfolio management application 112. The output device 112 may be a cathode-ray tube (CRT), a liquid crystal display (LCD) or any other type of output device.

Figure 2:
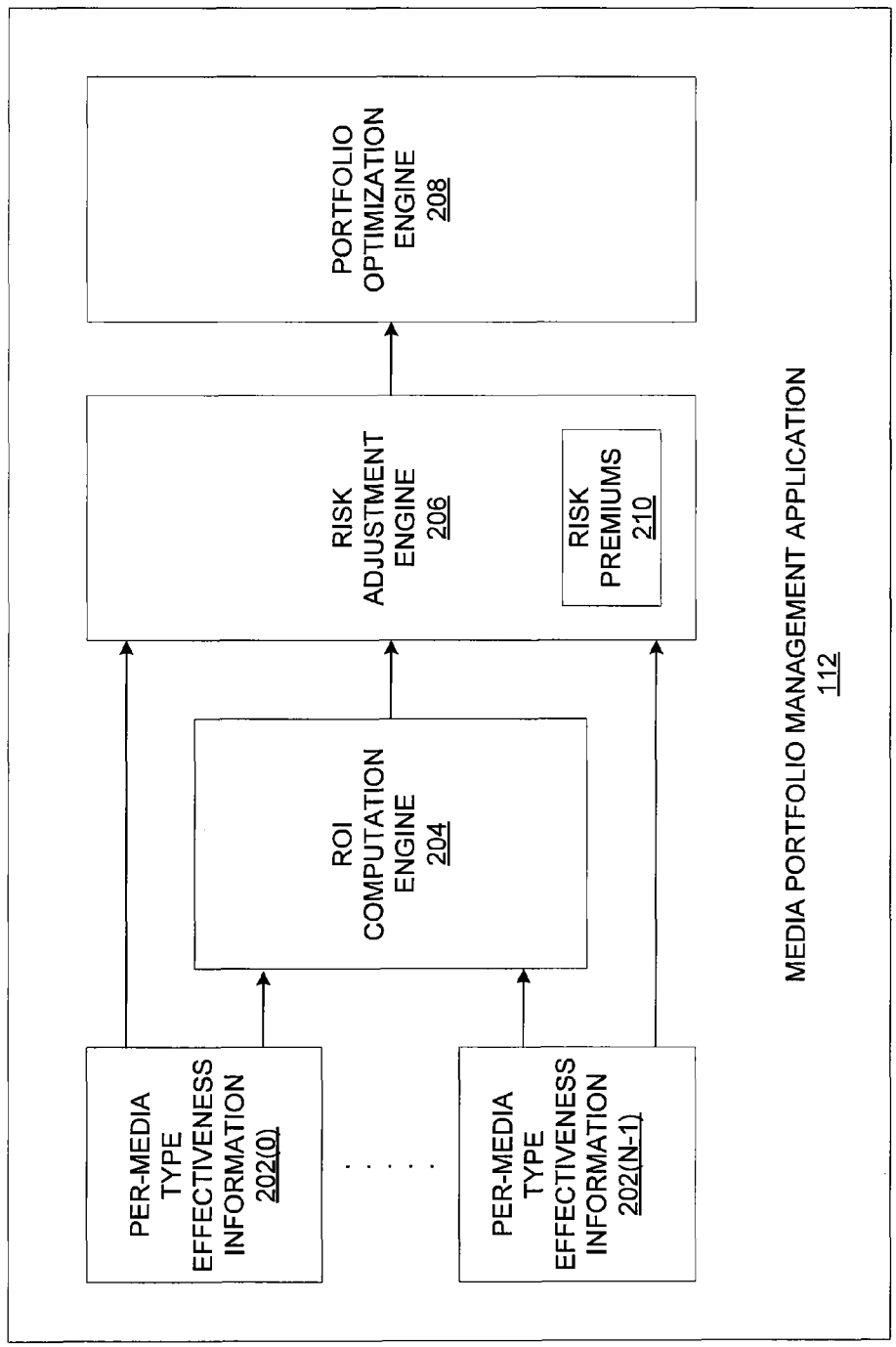
FIG. 2 is a more detailed view of the media portfolio management application of FIG. 1, according to one embodiment of the invention.

FIG. 2 is a more detailed view of the media portfolio management application 112 of FIG. 1, according to one embodiment of the invention. As shown, the media portfolio management application 112 includes per-media type information 202, a return on investment (ROI) computation engine 204, a risk adjustment engine 206 and a portfolio optimization engine 208.

For a given product or service, the media portfolio management application 112 determines an optimal investment strategy across a portfolio of media channels (referred to herein as a "media portfolio"). The media types within a particular media portfolio may vary based on the specific product or service at issue. For example, printed media advertising may not be included in a media portfolio directed towards TV shows, and radio advertising may not be included in a media portfolio directed towards video games.

Figure 3:
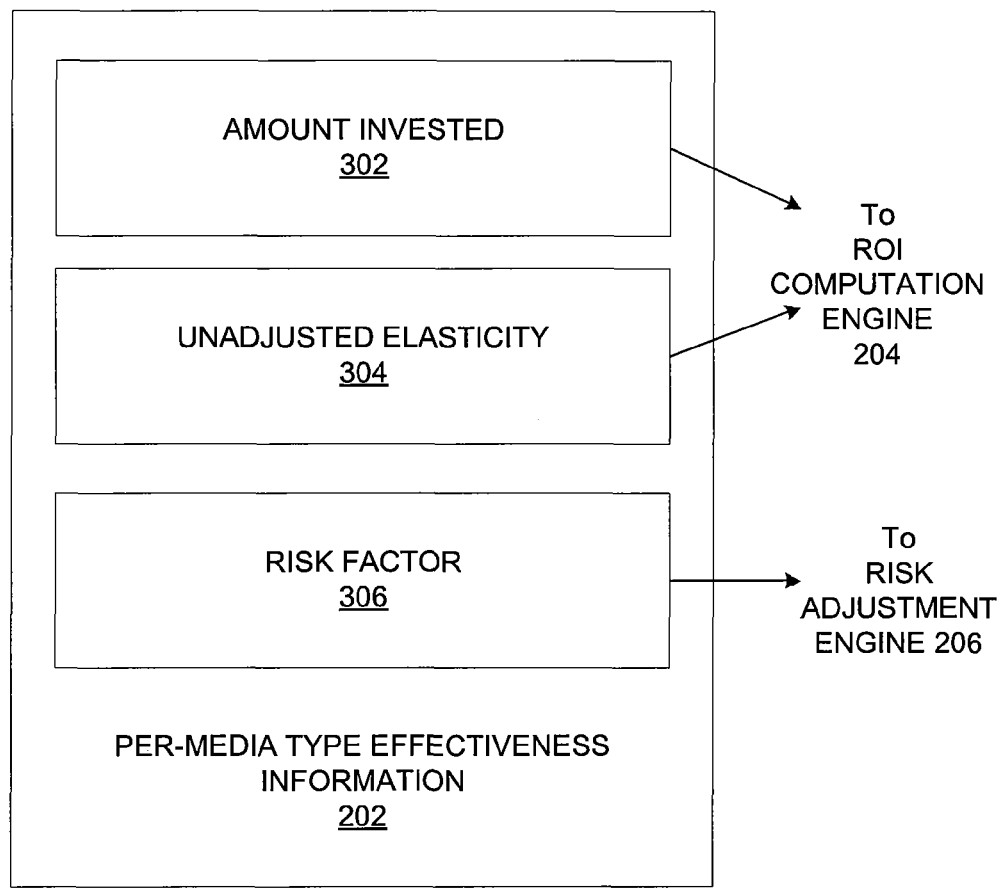
FIG. 3 is a more detailed view of the data included within per-media type information, according to one embodiment of the invention.

The optimal investment strategy for the given product or service is derived from data associated with the different media types included in the media portfolio associated with the given product or service. The data associated with each media type is input into the media portfolio management application 112 and included in different per-media type information 202. For example, per-media type information 202(0) is associated with the television media type and per-media type information 202(N-1) is associated with the social network media type. As shown in FIG. 3, per-media type information 202 includes an amount invested 302, an unadjusted elasticity 304 and a risk factor 306. The amount invested 302 specifies the total amount of resources currently invested in the media type associated with the per-media type information 202 over a specific period of time. The unadjusted elasticity 304 indicates the percentage change in a metric corresponding to the given product or service for a one percent increase in investment in the media type (referred to herein as the "elasticity coefficient of the media type"). The unadjusted elasticity 304 is discussed in greater detail below. The risk factor 306 indicates the accuracy of the unadjusted elasticity 304 associated with the per-media type information 202.

For the given product or service, the ROI computation engine 204 computes a marginal revenue for each media type included in the media portfolio based on the data stored in the per-media type information 202 associated with the media type. The marginal revenue for a particular media type indicates the revenue (measured in the metric corresponding to the given product or service) per unit of investment when the particular media type is used for marketing the given product or service. For a particular media type in the portfolio, the ROI computation engine 204 computes the marginal revenue based on the amount invested 302 and the unadjusted elasticity 304 included in the per-media type information 202 associated with the particular media type.

As set forth above, the amount invested 302 specifies the total amount of resources currently invested in the particular media type and the unadjusted elasticity 304 indicates the elasticity coefficient of the media type. In general, a media type associated with a high unadjusted elasticity 304 is more effective when used for marketing for the specific application relative to a media type associated with a low unadjusted elasticity 304. The unadjusted elasticity 304 is determined in any technically feasible fashion. In one embodiment, the unadjusted elasticity 304 is computed based on well-known econometric models, such as quasi-experimental analysis and historical look-back analysis.

When computing the marginal revenue for the particular media type, the ROI computation engine combines the amount invested 302 and the unadjusted elasticity 304 included in the per-media type information 202 associated with the particular media type in any mathematically feasible fashion. In a preferred embodiment, the following formula is used to compute the marginal revenue:

$$MR = \frac{e \times R}{AS}, \qquad (i)$$

where
MR is the marginal revenue, e is the unadjusted elasticity 304, R is the revenue measured from a current allocation and AS is the amount spent 304.

Once the marginal revenue for each media type in the media portfolio is computed, the marginal revenues are transmitted by the ROI computation engine 204 to the risk adjustment engine 206. For each media type in the media portfolio, the risk adjustment engine 206 adjusts the corresponding marginal revenue based on the risk factor 306 included in the per-media type information 202 associated with the media type. The risk factor 306 specifies a confidence interval indicating the accuracy of the unadjusted elasticity 304 associated with the per-media type information 202. The confidence interval is determined based on the type of econometric model employed to compute the unadjusted elasticity 304 as well as other factors that affect the accuracy of the unadjusted elasticity 304 such as the length of time over which data was gathered to determine the unadjusted elasticity 304. In general, when the confidence interval is large, the confidence level in the accuracy of the unadjusted elasticity 304 is low. Conversely, when the confidence interval is small, the confidence level in the accuracy of the unadjusted elasticity is high.

To adjust the marginal revenue, the risk adjustment engine 206 performs a Bayesian correction on the marginal revenue based on the risk factor 306 included in the per-media type information 202 associated with the media type as well as any additional risk premiums specified by the risk premiums 210. In one embodiment, the risk adjustment engine 206 adjusts marginal revenues such that the marginal revenue of a media type associated with risk factor 306 specifying a large confidence interval is shifted towards a pre-defined anchor value. Conversely, a marginal revenue of a media type associated with risk factor 306 specifying a small confidence interval remains unchanged. In such an embodiment, the pre-defined anchor value can be specified by the user or can be based on a minimum variance marketing portfolio that minimizes the standard deviation of the distribution of future returns on investment.

In alternate embodiments, any other Bayesian correction or other technically feasible risk-adjustment operations can be performed by the risk adjustment engine 206 to adjust the marginal revenues.

Referring back to FIG. 2, once the marginal revenue for each media type in the media portfolio is adjusted in any technically feasible fashion, the portfolio optimization engine 208 converts each adjusted marginal revenue to an adjusted elasticity. For each media type, the portfolio optimization engine 208 computes the corresponding adjusted elasticity based on the adjusted marginal revenue of the media type as well as the amount invested 302 included in the per-media type information 202 associated with the media type. The portfolio optimization engine 208 then determines the optimal level of investment in each media type in the set of media types based on the corresponding adjusted elasticity. In particular, the portfolio optimization engine 208 allocates more resources to a media type with a high adjusted elasticity relative to a media type with a low adjusted elasticity.

In an alternate embodiment, the risk adjustment engine 206 implements a Black Litterman approach when adjusting the marginal revenue associated with each media type in the media portfolio. In the Black Litterman approach, the current media portfolio allocation factors into the determination of the optimal media portfolio allocation. The Black Litterman approach includes three steps. First, the risk adjustment engine 206 computes a neutral reference point (NRP) for each media type in the media portfolio based on the risk premiums 210, the risk factor 306 and the marginal revenue associated with the media type. The marginal revenue is converted to a marginal rate of investment (ROI) using the following formula:

$$MROI = MR - 1, \text{ where} \tag{ii}$$

MROI is the marginal ROI and MR is the corresponding marginal revenue.

The neutral reference point for each media type in the media portfolio is computed as follows:

$$NRP = \Pi = \omega \Sigma \lambda, \text{ where} \tag{iii}$$

$\lambda \in \Re +$ is a parameter that captures the risk premium 210. In one embodiment, the risk premium 210 is defined by the user of media portfolio optimization application 112 and controls the degree of risk aversion towards the departure from the current allocation to each media type in the media portfolio.

$\Sigma$ is a variance/covariance matrix. There are three potential sources of variance that each defines a different component of variance that is incorporated in the variance/covariance matrix $\Sigma$. The first source defines the variability in revenues. The second source defines the variability in impressions. The third source defines the variability in the cost of impressions. In one embodiment, $\Sigma$ is diagonal, and the value of an element of the diagonal, like a particular media type such as TV, can be computed as:

$$\sigma_{tv}^2 = \sigma_{tv,r}^2 + \sigma_{tv,i}^2 + \sigma_{tv,c}^2, \text{ where} \tag{iv}$$

$$\sigma_{tv,r}^2 = \frac{\partial MROI_{TV}}{\partial \text{Revenues}} \times \sigma_{Revenues}^2 \tag{v}$$

$$\sigma_{tv,i}^2 = \frac{\partial MROI_{TV}}{\partial I} \times \sigma_I^2, \tag{vi}$$

where I is Impressions $$\sigma_{tv,c}^2 = \frac{\partial MROI_{TV}}{\partial C} \times \sigma_C^2, \tag{vii}$$

where C is Cost of Impressions $\omega$ is the vector that defines the historical media portfolio allocations.

The second step of the Black Litterman approach includes determining the marginal ROIs for the media portfolio as well as the risk factor 306 associated with each media type in the media portfolio (referred to herein as the "views"). The following notations are used:

$\theta$ is a vector of marginal ROIs for the media portfolio.

$\Omega$ is a matrix of variances/covariance around the marginal ROIs. In one embodiment, $\Omega$ is diagonal, and the value of an element of the diagonal, like TV, captures the risk factor 306 and can be computed as:

$$v_{tv}^2 = \frac{\partial MROI_{TV}}{\partial e_{tv}} \times \sigma_{e_{tv}}^2 \tag{viii}$$

In the third step of the Black Litterman approach, the risk adjustment engine 206 performs a computation of the neutral reference point and the views associated with each media type in the media portfolio to adjust the corresponding marginal ROI. In the Bayesian framework, there is an explicit analytical mathematical formula to do such a computation:

$$\text{Optimal portfolio} = \Gamma / \Sigma \lambda, \text{ where} \tag{ix}$$

$\Gamma = [\Pi / \Sigma \tau + \theta / \Omega] / [1 / \Sigma \tau + 1 / \Omega]$ and $\tau$ is a parameter, typically $<<1$, that captures the proportionality between marginal ROI standard deviation, and the standard deviation of marginal ROI sample mean.

Figure 4:
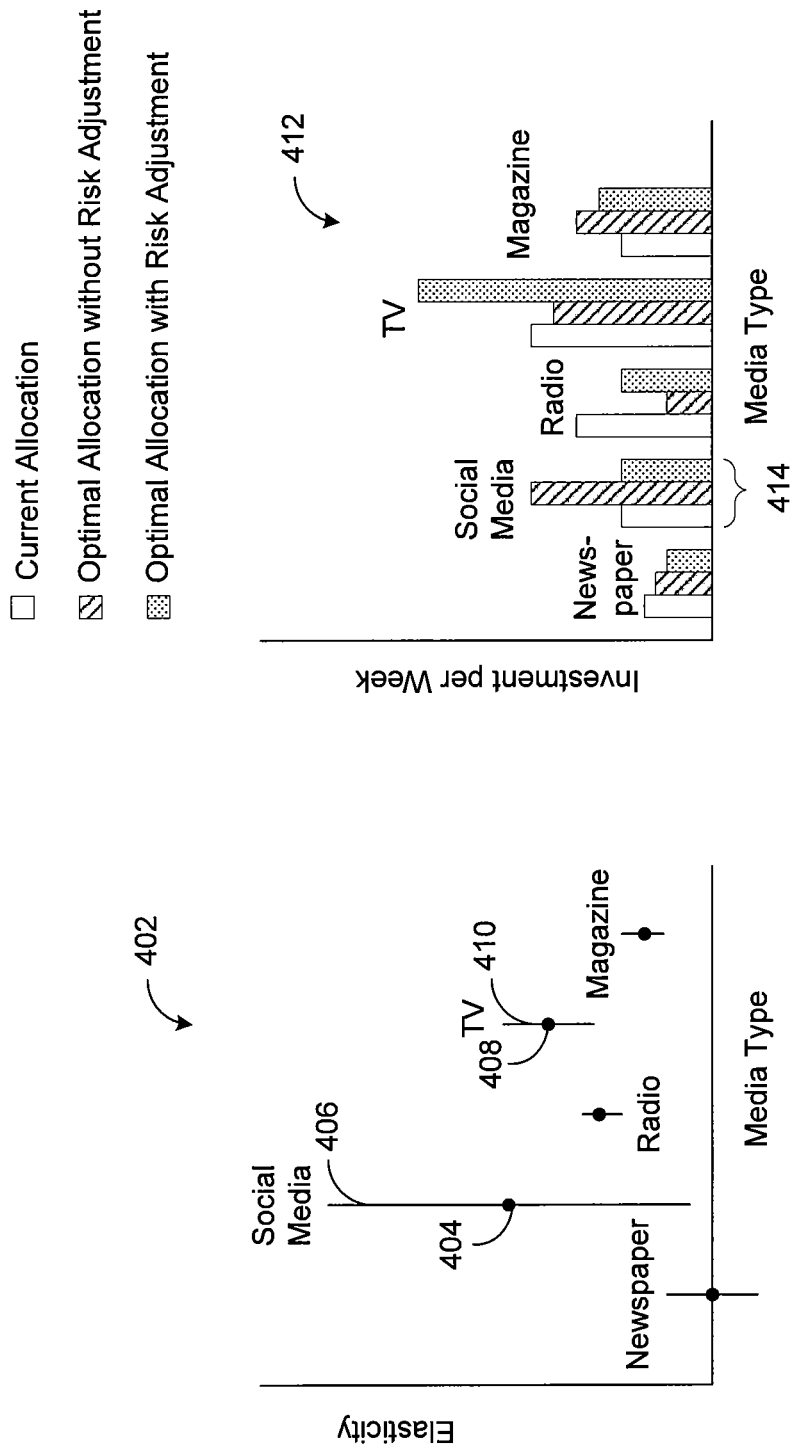
FIG. 4 is a visual representation of the elasticity and the risk factor associated with each media type in a media portfolio as well as the investment allocations to each media type, according to one embodiment of the invention.

FIG. 4 is a visual representation of the elasticity and the risk factor associated with each media type in a media portfolio as well as the investment allocations to each media type, according to one embodiment of the invention. As shown in the elasticity graph 402, each media type in the media portfolio has a specific unadjusted elasticity. Further, each unadjusted elasticity shown in graph 402 has a corresponding confidence interval (shown as the vertical line running through the unadjusted elasticity) that indicates a confidence level in the accuracy of the unadjusted elasticity. For example, the social media type has an unadjusted elasticity 404 and a confidence interval 406. Similarly, the TV media type has an unadjusted elasticity 408 and a confidence interval 410. The unadjusted elasticity 404 of the social media type is greater than the unadjusted elasticity 408 of the TV media type, however, the confidence interval 406 of the social media type is large indicating a low confidence level in the accuracy of the unadjusted elasticity 404.

As shown in the allocation graph 412, each media type has a corresponding current allocation, an optimal investment allocation without risk adjustment and an optimal investment allocation with risk adjustment as determined by the media portfolio management application 112. As shown by bars 414 associated with the social media type, the optimal allocation without risk adjustment increases the investment allocation to the social media type because of the high unadjusted elasticity. However, because the confidence interval 406 of the social media type is large indicating a low confidence level in the accuracy of the unadjusted elasticity 404, the optimal allocation risk adjustment as determined by the media portfolio management application 112 does not modify the investment allocation to the social media type.

Figure 5:
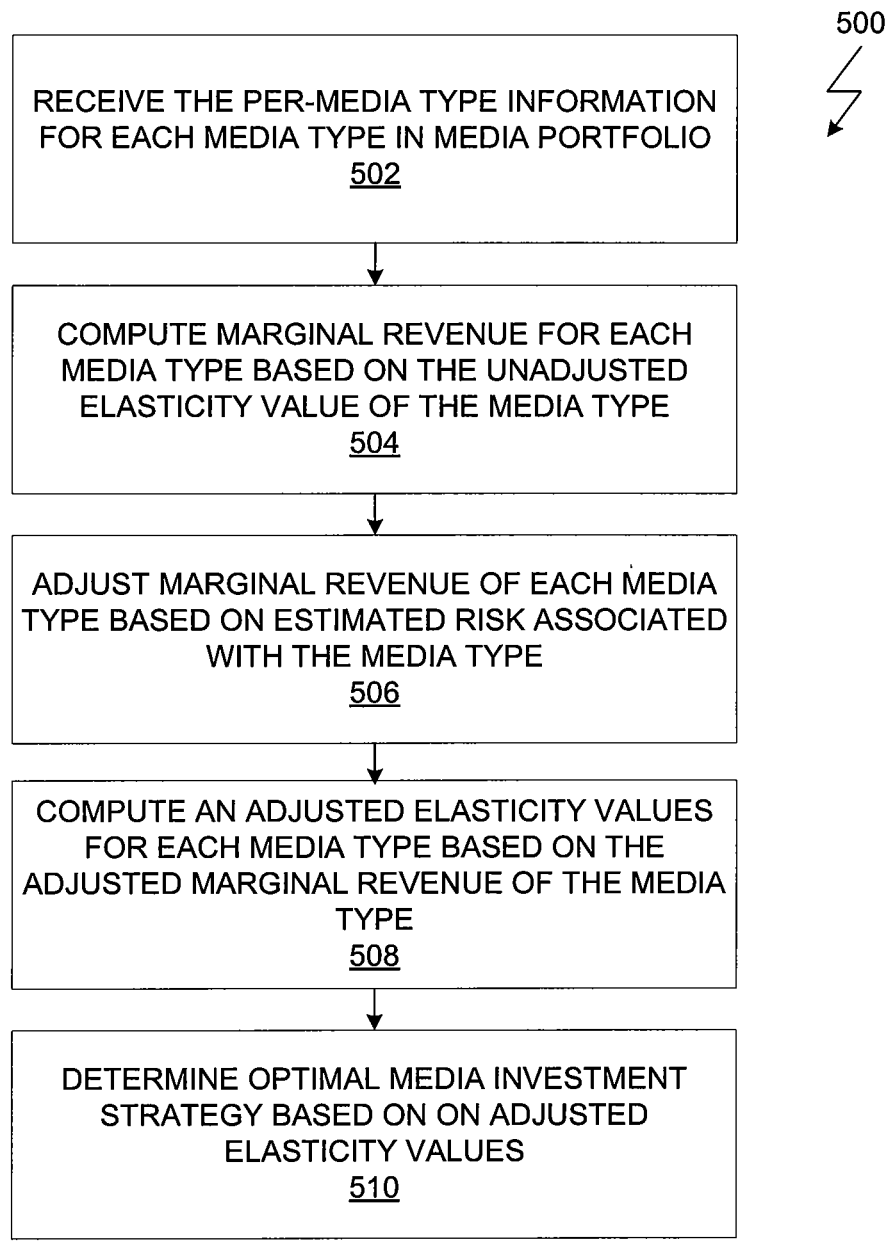
FIG. 5 is a flowchart of method steps for determining the optimal media marketing portfolio, according to one embodiment of the invention.

FIG. 5 is a flowchart of method steps for determining the optimal media marketing portfolio, according to one embodiment of the invention. Although the method steps are described in conjunction with the systems for FIGS. 1-3, persons skilled in the art will understand that any system configured to perform the method steps, in any order, is within the scope of the invention.

The method 500 begins at step 502, where the media portfolio management application 112 receives, as input, the per-media type information 202 for each media type in the media portfolio associated with a given product or service. At step 504, the ROI computation engine 204 computes a marginal revenue for each media type included in the media portfolio based on the data stored in the per-media type information 202 associated with the media type. Again, for a particular media type in the portfolio, the ROI computation engine 204 computes the marginal revenue based on the amount invested 302 and the unadjusted elasticity 304 included in the per-media type information 202 associated with the particular media type.

At step 506, for each media type in the media portfolio, the risk adjustment engine 206 adjusts the corresponding marginal revenue based on the risk factor 306 included in the per-media type information 202 associated with the media type. In one embodiment, to adjust the marginal revenue, the risk adjustment engine 206 performs a Bayesian correction on the marginal revenue based on the risk factor 306 included in the per-media type information 202 associated with the media type as well as any additional risk premiums specified by the risk premiums 210.

At step 508, the portfolio optimization engine 208 converts each adjusted marginal revenue to an adjusted elasticity. For each media type, the portfolio optimization engine 208 computes the corresponding adjusted elasticity based on the adjusted marginal revenue of the media type as well as the amount invested 302 included in the per-media type information 202 associated with the media type. At step 510, the portfolio optimization engine 208 determines the optimal level of investment in each media type in the set of media types based on the corresponding adjusted elasticity. Again, the portfolio optimization engine 208 allocates more resources to a media type with a high adjusted elasticity relative to a media type with a low adjusted elasticity.

One advantage of the systems and methods described herein is that the elasticity of a media type is adjusted based on an estimated risk indicating a confidence level in the accuracy of the elasticity. The adjusted elasticity then is used to determine an optimal investment strategy in a media portfolio that is less exposed to the risk of inaccurate elasticity measurements.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for determining an optimized investment strategy across a portfolio of media channels for a given product or service, the method comprising:

by operation of one or more computer processors:
receiving data associated with each media channel in the portfolio of media channels, wherein the data associated with a particular media channel includes an unadjusted elasticity that indicates a percentage change in a metric corresponding to the given product or service generated by a percentage increase in the level of investment in the media channel as well as a risk factor specifying a confidence interval that indicates a confidence level in the accuracy of the unadjusted elasticity;

for each media channel, computing a marginal revenue based on the unadjusted elasticity associated with the media channel, wherein the marginal revenue associated with a particular media channel indicates a change in the metric corresponding to the given product or service generated by a unit of additional investment in the media channel;

for each media channel, adjusting the marginal revenue associated with the media channel based on the risk factor included in the data associated with the media channel;

for each media channel, converting the adjusted marginal revenue associated with the media channel to an adjusted elasticity; and computing an optimized level of investment in each media channel included in the portfolio of media channels based on the adjusted elasticities associated with the media channels.

2. The method of claim 1, wherein the data associated with each media channel further includes a total amount of resources invested in the media channel over a specific period of time, and the step of computing the marginal revenue for the media channel is further based on the total amount invested in the media channel.

3. The method of claim 1, wherein the step of adjusting the marginal revenue associated with each media channel comprises either not modifying the marginal revenue associated with the media channel when the confidence interval is small, or reducing the marginal revenue associated with the media channel when the confidence interval is large.

4. The method of claim 3, wherein the risk factor further indicates the length of time over which data was gathered to determine the unadjusted elasticity.

5. The method of claim 4, wherein the step of adjusting the marginal revenue associated with each media channel further comprises either reducing the marginal revenue associated with the media channel when the risk factor indicates a short length of time, or not modifying the marginal revenue associated with the media channel when the risk factor indicates a long length of time.

6. The method of claim 1, wherein the metric corresponding to the given product or service comprises the product of the volume of sales of the given product or service and the average price of the unit of product or service.

7. The method of claim 1, wherein the metric corresponding to the given product or service comprises the product of the number of viewers of the given product or service and the average advertising revenue generated by each extra viewer.

8. The method of claim 1, wherein the sum of the investment in all of the media channels included in the set of media channels equals a pre-determined total level of investment.

9. A computer-readable storage medium storing instructions that, when executed by a processor, cause the processor to determine an optimized investment strategy across a portfolio of media channels for a given product or service, by performing the steps of:
   receiving data associated with each media channel in the portfolio of media channels, wherein the data associated with a particular media channel includes an unadjusted elasticity that indicates a percentage change in a metric corresponding to the given product or service generated by a percentage increase in the level of investment in the media channel as well as a risk factor specifying a confidence interval that indicates a confidence level in the accuracy of the unadjusted elasticity;
   for each media channel, computing a marginal revenue based on the unadjusted elasticity associated with the media channel, wherein the marginal revenue associated with a particular media channel indicates a change in the metric corresponding to the given product or service generated by a unit of additional investment in the media channel;
   for each media channel, adjusting the marginal revenue associated with the media channel based on the risk factor included in the data associated with the media channel;
   for each media channel, converting the adjusted marginal revenue associated with the media channel to an adjusted elasticity; and
   computing an optimized level of investment in each media channel included in the portfolio of media channels based on the adjusted elasticities associated with the media channels.

10. The computer-readable storage medium of claim 9, wherein the data associated with each media channel further includes a total amount of resources invested in the media channel over a specific period of time, and the step of computing the marginal revenue for the media channel is further based on the total amount invested in the media channel.

11. The computer-readable storage medium of claim 9, wherein the step of adjusting the marginal revenue associated with each media channel comprises either not modifying the marginal revenue associated with the media channel when the confidence interval is small, or reducing the marginal revenue associated with the media channel when the confidence interval is large.

12. The computer-readable storage medium of claim 11, wherein the risk factor further indicates the length of time over which data was gathered to determine the unadjusted elasticity.

13. The computer-readable storage medium of claim 12, wherein the step of adjusting the marginal revenue associated with each media channel further comprises either reducing the marginal revenue associated with the media channel when the risk factor indicates a short length of time, or not modifying the marginal revenue associated with the media channel when the risk factor indicates a long length of time.

14. The computer-readable storage medium of claim 9, wherein the metric corresponding to the given product or service comprises the product of the volume of sales of the given product or service and the average price of the unit of product or service.

15. The computer-readable storage medium of claim 9, wherein the metric corresponding to the given product or service comprises the product of the number of viewers of the given product or service and the average advertising revenue generated by each extra viewer.

16. The computer-readable storage medium of claim 9, wherein the sum of the investment in all of the media channels included in the set of media channels equals a pre-determined total level of investment.

17. A computer system, comprising:
   one or more computer processors; and
   a memory containing a program, which when executed by the one or more computer processors, performs an operation to determine an optimized investment strategy across a portfolio of media channels for a given product or service, the operation comprising:
      receiving data associated with each media channel in the portfolio of media channels, wherein the data associated with a particular media channel includes an unadjusted elasticity that indicates a percentage change in a metric corresponding to the given product or service generated by a percentage increase in the level of investment in the media channel as well as a risk factor specifying a confidence interval that indicates a confidence level in the accuracy of the unadjusted elasticity,
      for each media channel, computing a marginal revenue based on the unadjusted elasticity associated with the media channel, wherein the marginal revenue associated with a particular media channel indicates a change in the metric corresponding to the given product or service generated by a unit of additional investment in the media channel,
      for each media channel, adjusting the marginal revenue associated with the media channel based on the risk factor included in the data associated with the media channel,
      for each media channel, converting the adjusted marginal revenue associated with the media channel to an adjusted elasticity, and
      computing an optimized level of investment in each media channel included in the portfolio of media channels based on the adjusted elasticities associated with the media channels.

18. The system of claim 17, wherein adjusting the marginal revenue associated with each media channel comprises either not modifying the marginal revenue associated with the media channel when the confidence interval is small, or reducing the marginal revenue associated with the media channel when the confidence interval is large.

19. The system of claim 18, wherein the risk factor further indicates the length of time over which data was gathered to determine the unadjusted elasticity.

20. The system of claim 19, wherein adjusting the marginal revenue associated with each media channel further comprises either reducing the marginal revenue associated with the media channel when the risk factor indicates a short length of time, or not modifying the marginal revenue associated with the media channel when the risk factor indicates a long length of time.

* * * * *

UNITED STATES PATENT AND TRADEMARK OFFICE
CERTIFICATE OF CORRECTION

PATENT NO. : 8,744,947 B1
APPLICATION NO. : 12/794408
DATED : June 3, 2014
INVENTOR(S) : Campo-Rembado et al.

Page 1 of 1

It is certified that error appears in the above-identified patent and that said Letters Patent is hereby corrected as shown below:

In the Specification:

Column 6, Line 8, please delete " $\sigma_{rv,I}^2 = \frac{\partial MROI_{TV}}{\partial I} x \sigma_{I}^2$ ,"

and insert -- $\sigma_{rv,i}^2 = \frac{\partial MROI_{TV}}{\partial I} x \sigma_{I}^2$ -- therefor.

Signed and Sealed this
Twenty-third Day of September, 2014

Michelle K. Lee
*Deputy Director of the United States Patent and Trademark Office*